UNITED STATES PATENT OFFICE.

ELI KEITH AND BARCLAY THORN, OF LA FONTAINE, INDIANA.

IMPROVED COMPOSITION FOR TANNING.

Specification forming part of Letters Patent No. 49,886, dated September 12, 1865.

*To all whom it may concern:*

Be it known that we, ELI KEITH and BARCLAY THORN, of La Fontaine, in the county of Wabash and State of Indiana, have invented a new and useful Improvement in Composition for Tanning; and we do hereby declare the following to be a full, clear, and exact description of the ingredients, mode of combining the same, and the method of using the composition sufficient to enable one skilled in the branch of manufacture to which our invention appertains to make use of the said invention.

The ingredients which we use are four—namely, terra-japonica, lye, (or solution of potash or soda,) salt, chloride of sodium, sulphuric acid—the said ingredients being dissolved in water in about the proportions hereinafter stated, and the liquor being occasionally strengthened, as will be mentioned presently. The terra-japonica gives color, solidity, and firmness to the leather, as well as acting directly by its tannin to tan the leather. The lye raises the leather, making it soft and pliable, and permeable to the tannin principle or ingredient. The salt is cleansing and antiseptic, and gives a permanent softness to the leather. The sulphuric acid acts upon the matters present in the hide whose condition it is required to change, or which are to be removed to give place to the tannin principle, and eventually becomes changed by union with the salt, forming sulphate of soda.

The operation is about as follows, (we, of course, do not confine ourselves to the exact proportions or time, but give the following as a *bona fide* statement of what we consider a good and effective mode of compounding and using the composition, and the one which we have practically adapted:) The hides are limed and bated as usual before they are ready for our tanning process. Then for (30) thirty sides of upper leather take four hundred gallons of water, one hundred and fifty pounds of terra-japonica, six gallons lye, thirty pounds of salt, one and one-half pounds of sulphuric acid. These are to be compounded in manner following: To the four hundred gallons of water add thirty pounds of japonica previously dissolved in hot water and strained. Then add two gallons of lye and ten pounds of salt. The hides being placed in the liquor thus compounded are "handled up" twice a day for three days, then taken out and strained. To strengthen the liquor then add sixty pounds of japonica, four gallons of lye, and ten pounds of salt; replace the hides in the liquor, and handle them up twice a day for five days; agitate and stir up the liquor each time the hides are handled. The hides are again removed and strained, and the liquor strengthened by the remaining portion of the ingredients—that is to say, sixty pounds of japonica, ten pounds of salt, and one and one-half pounds of sulphuric acid. The hides being again plunged into the liquor are handled up twice a day for ten days, when the process of tanning is completed. When removed from the liquor the hides should be crossed and flattened, being replaced therein. The lye should be strong—say, —— pounds of potash or soda to a gallon of water.

To tan twenty calf-skins in twelve days make a liquor with four hundred gallons of water, fifty pounds of japonica, two gallons of lye, fifteen pounds of salt; place the hides therein, and handle up twice a day for four days; take out the skins and strain; add to the liquor seventy pounds of japonica, three gallons of lye, ten pounds of salt, one pound of sulphuric acid. In the liquor thus strengthened plunge the hides, and handle them up twice a day for eight days. This completes the operation.

Harness and sole leather will be treated with quantities and time proportionate.

Having described our invention, what we claim therein as new, and desire to secure by Letters Patent, is—

The combination of ingredients in the proportions and in the manner substantially as described, and for the purpose described.

ELI KEITH.
BARCLAY THORN.

Witnesses:
MERRITT J. SCHACKELFORD,
WILLIAM STEWART.